United States Patent [19]

Nagae

[11] Patent Number: 4,694,927
[45] Date of Patent: Sep. 22, 1987

[54] VEHICULAR SPEED RESPONSIVE POWER STEERING DEVICE

[75] Inventor: Kiyoshi Nagae, Aichi, Japan

[73] Assignee: Tokai TRW & Co., Ltd., Aichi, Japan

[21] Appl. No.: 852,795

[22] Filed: Apr. 16, 1986

[30] Foreign Application Priority Data

Apr. 19, 1985 [JP] Japan ............................. 60/84344

[51] Int. Cl.$^4$ .......................................... B62D 5/06
[52] U.S. Cl. .............................. 180/132; 60/422; 60/426; 60/468
[58] Field of Search ............ 180/132, 141, 143, 148; 74/388 PS; 92/136; 60/422, 426, 468

[56] References Cited

U.S. PATENT DOCUMENTS 3,897,845  8/1975  Von Löwis of Menar ........ 180/148

FOREIGN PATENT DOCUMENTS 3246137  6/1984  Fed. Rep. of Germany ...... 180/132
188755  11/1983  Japan .................................. 180/148
188752  11/1983  Japan .................................. 180/148

Primary Examiner—John J. Love
Assistant Examiner—Mitchell J. Hill
Attorney, Agent, or Firm—Tarolli, Sundheim & Covell

[57] ABSTRACT

There is provided a vehicular speed responsive power steering device. The power steering device comprises a main pump unit adapted to supply oil under pressure through a control valve to an actuator to thereby assist steering force. The main pump unit comprises a vehicular speed responsive pump having the suction port connected to an oil passage extending between the discharge port of the main pump unit and the control valve and a reaction mechanism for controlling the operation of the control valve.

2 Claims, 7 Drawing Figures

VEHICULAR SPEED RESPONSIVE POWER STEERING DEVICE

BACKGROUND OF THE INVENTION

This invention relates to a vehicular speed responsive power steering device and more particularly, to a vehicular speed responsive power steering device which varies power assist amount depending upon vehicular speed.

There have been proposed a variety of vehicular speed responsive power steering devices such as a power steering device in which a vehicular speed responsive pump operates a cut-off valve and the inner pumping pressure of a main pump operates a reactive plunger, a power steering device in which a vehicular speed responsive pump controls a valve adapted to bypass a supply oil passage and a tank return oil passage, a power steering device in which a valve adapted to bypass a supply oil passage and a tank return oil passage is controlled in proportion to vehicular speed and angular steering rate of steering wheel gripping force, a power steering device in which a bypass pump between the two chambers of an actuator is controlled by a vehicular speed signal or vehicular speed and actual steering angle signals or alternatively by a vehicular speed responsive pump, a power steering device in which a pump flow rate regulation valve is controlled by a solenoid in proportion to vehicular speed, angular steering speed and lateral acceleration, a power steering device in which a pump flow rate regulation valve is controlled by a stepping motor in proportion to vehicular speed and a power steering device in which a variable delivery pump is controlled in proportion to vehicular speed.

However, the prior art power steering devices require complicated components most of which are precision elements and thus, expensive. Furthermore, the prior art power steering devices present the problem that the devices can not easily exhibit performance characteristics called for.

SUMMARY OF THE INVENTION

The present invention has its purpose to provide an improved vehicular speed responsive power steering device which can eliminate the problems inherent in the prior art power steering devices referred to hereinabove. According to the present invention, there has been provided a vehicular speed responsive power steering device which comprises a main pump unit adapted to supply oil under pressured to an actuator through a control valve to thereby assist steering power and which is characterized by an oil passage connecting between the dischard port of the main pump unit and the control valve, the control valve includes a vehicular speed responsive pump connected to the suction port of the main pump unit and a reactive mechanism for controlling the operation of the control valve, the discharge port of the vehicular speed responsive pump is connected to the reactive mechanism and through a reactive pressure check valve and a reactive pressure orifice to an oil passage extending between the discharge port of the main pump unit and the pressure port of the control valve and to an oil passage extending between the return port of the control valve and the reservoir of the main pump unit, respectively.

The above and other objects and attendant advantages of the present invention will be more readily apparent to those skilled in the art from a reading of the following detailed description in conjunction with the accompanying drawings which show one preferred embodiment of the present invention for illustration purpose only, but not for limiting the scope of the same in any way.

PREFERRED EMBODIMENT OF THE INVENTION

Figure 1:
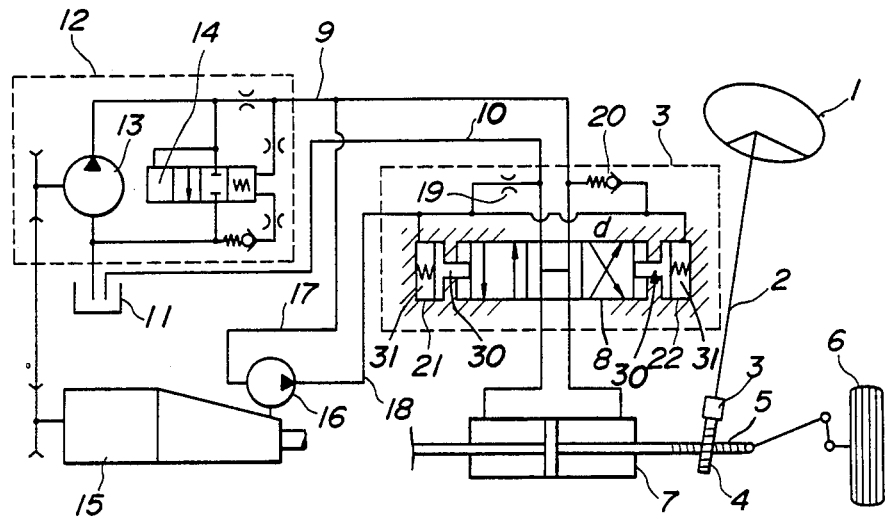
FIG. 1 is a schematic view of the preferred embodiment of the vehicular speed responsive power steering device constructed in accordance with the present invention.

First referring to FIG. 1 of the accompanying drawings which is a schematic view of the preferred embodiment of the vehicular speed responsive power steering device constructed in accordance with the present invention, steering wheel 1 is secured to one end of a column shaft 2 which has control valve 3 mounted thereon in an intermediate positon between the opposite ends thereof. A pinion 4 is mouned at the other end of the column shaft 2. The pinion 4 engages a rack bar 5 which is connected at one end through a tie rod and a knuckle arm to a wheel 6 and also to the piston rod of an actuator 7 which is in turn connected through the valve member 8 of the control valve 3 to a main pump unit discharge oil passage 9 and a tank return oil passage 10. The other end of the rack bar 5 is connected to the other wheel (not shown). The tank return oil passage 10 and the main pump unit discharge oil passage 9 are in turn connected to an oil tank 11 and a main pump unit 12, respectively. The main pump unit 12 includes a main pump 13 and a flow rate regulation valve 14 provided with a known relief mechanism (not shown) and is adapted to supply oil under pressure at a rate corresponding to the rotational rate of an engine 15 which has the last output shaft (not shown) to which a vehicular speed responsive pump 16 is connected. The vehicular speed responsive pump 16 is in turn connected through a vehicular speed responsive suction oil passage 17 to the main pump unit discharge oil passage 9. The vehicular speed responsive pump 16 is further connected through a vehicular speed responsive pump discharge oil passage 18 and a reactive pressure orifice 19 to the tank return oil passage 10 and through the vehicular speed responsive pump discharge oil passage 18 and a reactive pressue check valve 20 to the main pump unit discharge oil passage 9. The vehicular speed responsive pump discharge oil passage 18 is connected to control valve reactive mechanisms 21, 22 associated with the valve member 8. The control valve reactive mechanisms 21 and 22 operate to urge the valve member 8 to the neutral postion. Such reactive mechanisms are well known in the art. In the described embodiment, each of the mechanisms 21 and 22 comprises a piston 30 and a compression spring 31 for biasing the piston in a position in which it urges the valve member 8 towards its neutral position.

Figure 2:
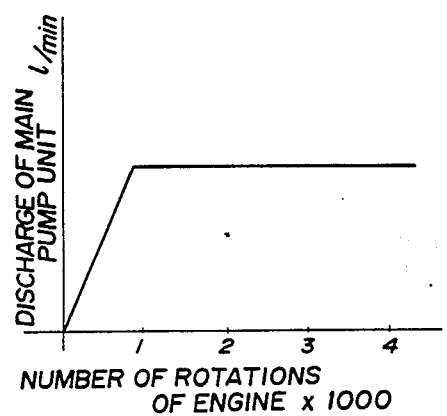
FIG. 2 is a characteristic diagram of the discharge of the engine-driven main pump unit against the number of rotations of the engine in the power steering device of FIG. 1.
Figure 3:
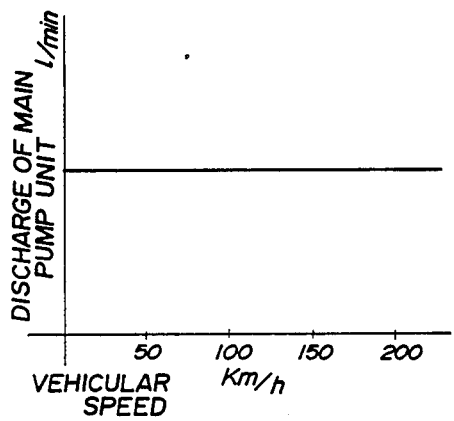
FIG. 3 is a characteristic diagram of the discharge of the engine-driven main pump unit against vehicular speed.
Figure 4:
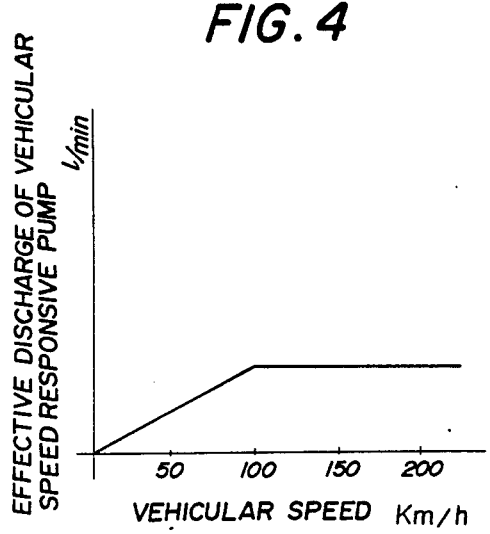
FIG. 4 is a characteristic diagram of the effective discharge of the vehicular speed responsive pump in the hydraulic circuit constituted by the vehicular speed responsive pump adapted to be driven in proportion to the rotation of the last output shaft of the engine, the orifice and the pressure check valve.
Figure 5:
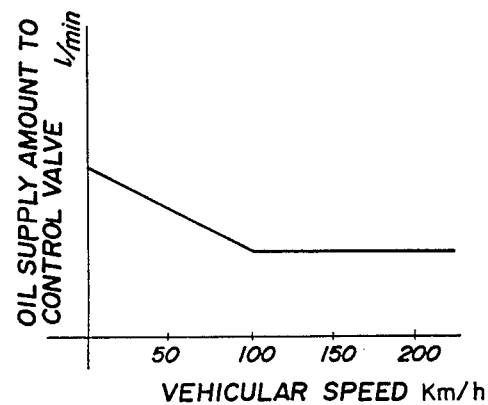
FIG. 5 is a characteristic diagram of the oil amount to be supplied to the control valve in the power steering against vehicular speed.
Figure 6:
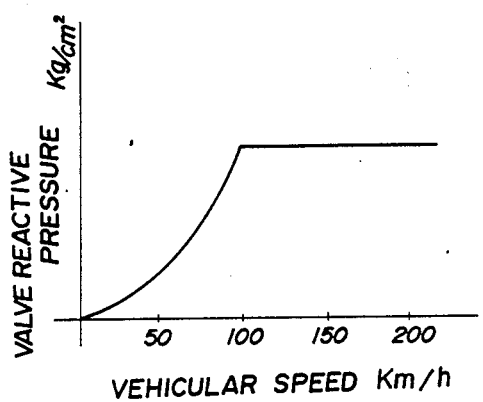
FIG. 6 is a characteristic diagram of the pressure in the hydraulic circuit constituted by the vehicular speed responsive pump, the orifice and the pressure check valve or the control valve reactive pressure against vehicular speed.

The operation of the embodiment of the vehicular speed responsive power steering device of the present invention will be now described referring to FIGS. 2 to 7 inclusive. First of all, the oil discharge characteristic corresponding to the rotational rate of the main pump 13 driven by the engine 15 and to that of the pump unit 12 including the flow rate regulation valve 14 varies linearly until the number of rotations of substantially idling and remains constant for the numbers of rotations above idling as shown in FIG. 2. And since the number of rotations of the engine 15 when the vehicle is running is higher than at idling, the discharge characteristic of the pump unit against the speed of the vehicle is substantialy constant as shown in FIG. 3. And since the discharge of the vehicular speed responsive pump 16 increases as the vehicular speed increases, the pressure in the vehicular speed responsive discharge oil passage 18 increases in proportion to increase in the flow rate of oil passing through the reactive pressure orifice 19. When the pressure reaches a set pressure for the reactive pressure check valve 20, any excess of the oil under pressure is returned to the main pump unit discharge oil passage 9. Thus, the effective discharge of the vehicular speed responsive pump 16 will be as shown in FIG. 4 and the pressure within the vehicular speed discharge oil passage 18 will be as shown in FIG. 6.

Figure 7:
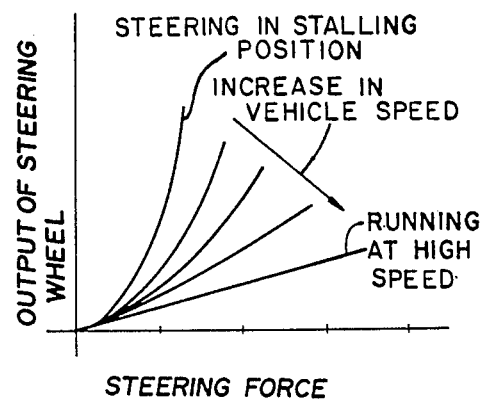
FIG. 7 is a characteristic diagram of steering force and output of steering wheel obtainable by the multiplied effect of the oil amount to be supplied to the control valve in the power steering and control valve reactive pressure against vehicular speed.

And the amount of oil to be supplied to control valve 3 is the difference between the characteristic diagram of FIG. 3 and the characteristic diagram of FIG. 4 from arrangement of the circuit of FIG. 1 and thus, the oil amount decreases gradually until the set vehicular speed, for example, 100 km/h is attained and becomes constant at speeds over the set vehicular speed. And by the multiplied effect of the supply oil amount characteristic to the control valve 8 depending upon vehicular speed and the reactive pressure characteristic from the control valve reactive mechanism of the control valve 8, the characteristics of steering force and output of steering wheel against vehicular speed show that steering force is small and output of steering wheel is high at slow vehicular speed as shown in FIG. 7 whereby steering in parking can be easily attained. Since output of steering wheel decreases as vehicular speed increases, steering and steering wheel holding senses suitable for vehicular speed can be obtained.

As clear from the foregoing description of the preferred embodiment of the vehicular speed responsive power steering device of the present invention, according to the present invention, since the main pump unit is a constant flow rate regulation mechanism, the power steering device is simple in construction, the steering characteristic is stable and the device is less expensive. And since the metrical vehicular speed responsive pump regulates the supply oil amount in proportion to vehicular speed, the oil supply amount is reliable and since the metrical vehicular speed responsive pump and orifice regulate the control valve reactive pressure in proportion to vehicular speed reliance on the pressure is high and since he control mode is realized by the combination of a small number of elements, steering characterstics suitable for vehicular speeds can be obtained by the multiplied effect.

The advantages of the present invention, as well as certain changes and modifications of the disclosed embodiment thereof, will be readily apparent to those skilled in the art. It is applicant's intention to cover by the claim all those changes and modifications which could be made to the embodiment of the invention herein chosen for the spirit and scope of the invention.

What is claimed is:

1. A power assisted steering apparatus for a vehicle comprising:
    an actuator for providing power assist;
    a main pump for supplying fluid flow to said actuator;
    control valve means for controlling fluid flow from said main pump to said actuator;
    first passage means for communicating fluid flow from said main pump to said control valve; and
    means for varying the power assist in accordance with a vehicle speed, said means comprising a vehicle speed responsive pump having an inlet port and an outlet port, second passage means for connecting said inlet port of said vehicle speed responsive pump with said first passage means, third passage means for connecting said outlet port of said vehicle speed responsive pump with a reservoir, a reactive pressure orifice located in said third passage means, and a reactive pressure check valve which is located between said third and first passage means, opens in response to a fluid pressure to direct flow from the third passage means to the first passage means, and communicates with said third passage upstream of said reactive pressure orifice.

2. A vehicle speed responsive power steering apparatus comprising:
    an actuator for providing power assist to steering;
    a main pump for supplying fluid to said actuator;
    a control valve for controlling fluid flow from said main pump to said actuator, said control valve comprising a valve member and reactive mechanisms for biasing said valve member to its neutral position;
    a fluid reservoir;
    a first discharge passage for communicating fluid flow from said main pump to said control valve;
    a return passage for communicating fluid flow from said control valve to said reservoir;
    a vehicle speed responsive pump;
    a second discharge passage for communicating fluid flow from said vehicle speed responsive pump to said reactive mechanisms;
    a reactive pressure orifice providing fluid communication between said return passage and said second discharge passage; and
    a reactive pressure check valve located between said first discharge passage and said second discharge passage and which opens in response to fluid pressure to direct flow from said second discharge passage to said first discharge passage.

* * * * *